April 10, 1945.  I. W. SCHULTZ  2,373,267
TRIMMING MACHINE
Filed Aug. 5, 1944
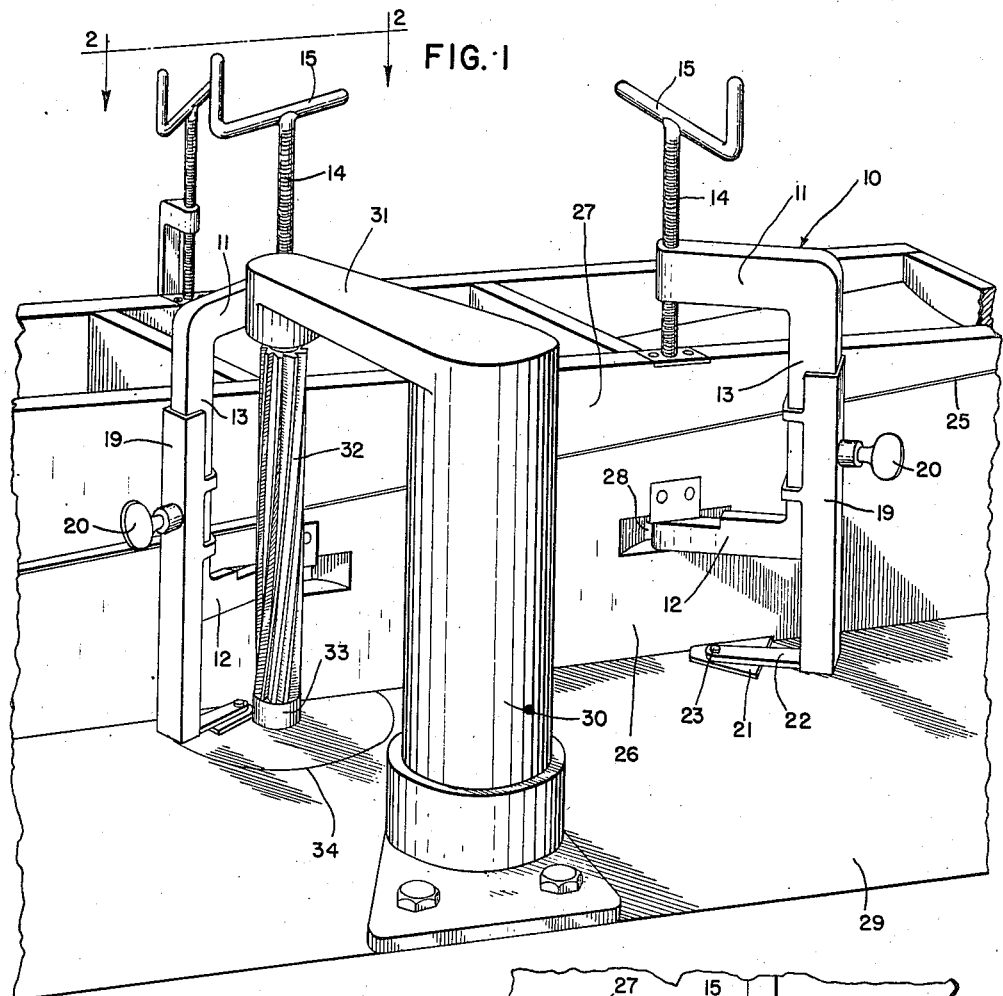
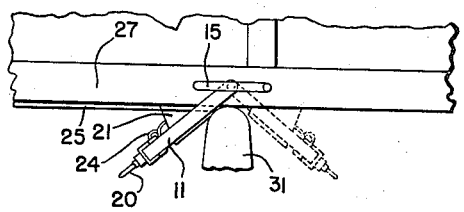
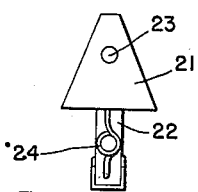
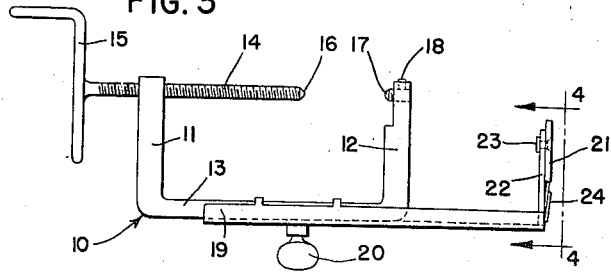
INVENTOR.
IRVING W. SCHULTZ
BY
ATTORNEY Patented Apr. 10, 1945

2,373,267

UNITED STATES PATENT OFFICE 2,373,267

TRIMMING MACHINE

Irving W. Schultz, Buffalo, N. Y., assignor to Curtiss-Wright Corporation, a corporation of Delaware Application August 5, 1944, Serial No. 548,284

1 Claim. (Cl. 90—11)

This invention relates to the art of trimming. More specifically, it relates to safety means for preventing damage to trimming machines and the operators of trimming machines.

In the art of trimming or cutting material, particularly sheet material, to size, sometimes referred to as "routing," it has been customary to clamp forms on a formed part by ordinary C-shaped clamps. The clamped forms and part are engaged by a rotating trimming roller mounted co-axially with a rotating trimming blade. As the rotating roller and blade move along the face of the forms and associated part, the blade trims excess material from the part, and is guided by the shape of the forms. As the clamp is approached the operator removes it, trims that section and replaces it. Obviously, sometimes the operator forgets the clamp and the resulting action of the trimming blade contacting the clamp causes dulled tools, ruined clamps, and may result in serious injuries to the operator.

It is, therefore, an object of the invention to provide a mechanism permitting continuous trimming operation without hazard to the operator or tools. It is another object to provide safety means for preventing the blade from engaging the clamp. Other objects will appear hereinafter.

These objects are accomplished by means of the present invention, which may be more readily understood by reference to the accompanying drawing, in which: Figure 1 is a general perspective view of a trimming machine or mechanism embodying the present invention; Figure 2 is a view taken along the line 2—2 of Figure 1; Figure 3 is a view in elevation of a clamp employed in the mechanism shown in Figure 1; and Figure 4 is a view taken along the line 4—4 of Figure 3.

Referring now to the drawing, a C-clamp 10 is composed of two arms 11 and 12 extending at right angles from a connecting piece 13. The C-clamp 10 has a screw jack 14 operated by a handle 15 and having a tapered end 16. Coaxially with the screw jack 14 is an adjustable screw 17 also having a tapered end, and which may be locked after adjustment by means of a set screw 18. A guide holder 19 is slidably mounted on connecting arm 13 of clamp 10, and may be locked in place by means of set screw 20. At the end of the guide holder 19 is an arm 22 carrying a guide 21 on a pin 23. The guide 21 is rotatable about pin 23, but is restrained in its movement by means of a spring 24.

Referring now to Figures 1 and 2, a formed skin 25 is clamped between forms 26 and 27 by means of clamp 10. The arm 12 is inserted in an opening 28 in form 26, while end 16 of screw jack 14 bears against the upper surface of form 27. The form 26 rests on any suitable work surface 29. The guide holder 19 is adjusted until the guide 21 rests against surface 29 or is preferably held a short distance away from surface 29, and is then locked in position by means of set screw 20.

A post 30 is mounted on work surface 29, and is provided with an arm 31. On the end of the arm 31 is mounted a rotatable trimming tool 32 (rotated by any suitable means, not shown) and at the end thereof a free-running roller 33. Roller 33 rests against work surface 29 or is held a short distance away therefrom.

In operation, the holder 26, together with the associated sheet 25, holder 27 and clamps 10, is moved along the face of trimming tool 32 with the roller 33 in rolling contact with holder 26. Assuming that the holder 26 is being moved to the right in Figure 1, the right-hand clamp 10 has already passed tool 32, while the left-hand clamp 10 is just about to come in contact with tool 32. With the prior form of construction, tool 32 would tend to contact arm 12, with resulting damage to both tool and arm. With the present form of construction, roller 33 immediately comes in contact with guide 21, with the result that the holder 26 and its associated elements are fended away from tool 32. When this occurs, the holder 26 and its associated elements are withdrawn from the vicinity of the tool, and the clamp 10 then swung through the arc of a circle, indicated at 34, to the dotted line position shown in Figure 2. The work is then again brought in contact with the cutter 32, and its movement to the right continued. Spring 24 allows guide 21 to rotate to abut against holder 26.

The above discussion has been in connection with a specific form of the invention. It is obvious, however, that many changes may be made in this form without departing from the spirit of the invention. It is to be understood, therefore, that the invention is not to be limited except as defined in the appended claim.

I claim:

In a trimming machine, a rotatable cutting tool, a freely rotatable guide roller mounted coaxially with said cutting tool, a pair of forms adapted to hold a work piece between them, a C-clamp urging said forms together, said clamp including a pair of arms and a connecting piece, an arm slidably mounted on said connecting piece of said clamp, means for locking said slidable arm on said connecting piece, a pivotally mounted guide on said slidable arm adapted to contact said guide roller and keep said cutting tool from contact with said arms of said C-clamp, and a spring restraining pivotal movement of said guide.

IRVING W. SCHULTZ.